Oct. 30, 1951          B. CHANCE          2,572,986
RADAR TRACKING SYSTEM
Filed March 22, 1945
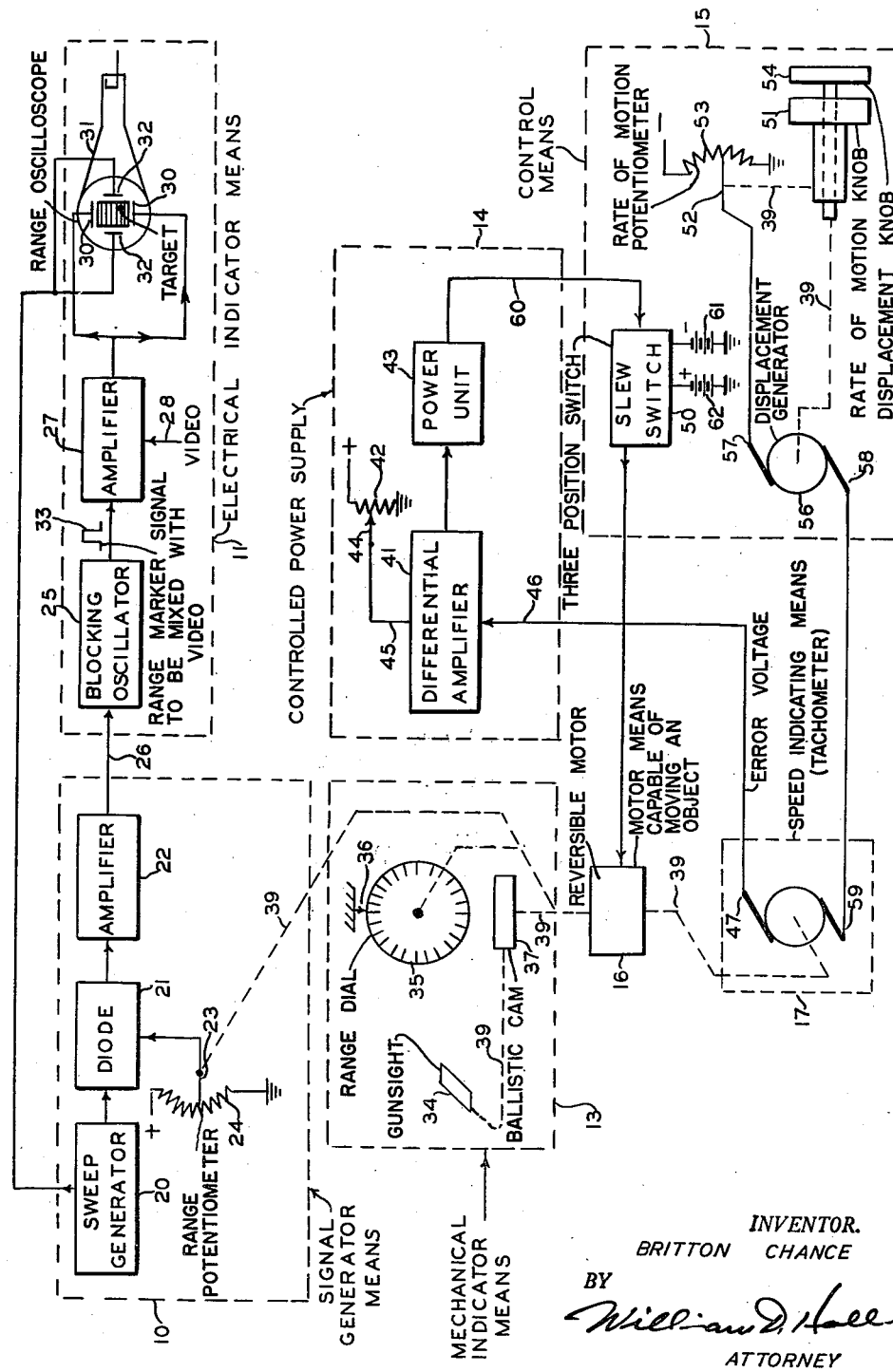
INVENTOR.
BRITTON CHANCE
BY
William D. Hall
ATTORNEY Patented Oct. 30, 1951

2,572,986

UNITED STATES PATENT OFFICE 2,572,986

RADAR TRACKING SYSTEM

Britton Chance, Cambridge, Mass., assignor, by mesne assignments, to the United States of America as represented by the Secretary of War Application March 22, 1945, Serial No. 584,231

6 Claims. (Cl. 343—5)

This invention relates to electrical systems and more particularly to rate control systems.

In many applications it is desirable to move an object at a predetermined uniform rate. In many cases it is desirable that the rate be adjustable to any constant rate from zero to some maximum rate determined by the system. It is also desirable to provide means in a system for moving an object at a fixed rate to displace the object being moved either in the direction of motion or in a direction opposite to the direction of motion. Mechanical systems employing differentials and ball and disk drives have been devised to move an object at a constant rate but in many cases the system requires complicated electrical or mechanical arrangements.

It is an object of the present invention to provide a simple electrical system for moving an object at a constant rate and to provide means for introducing displacements in the motion of said object independent of the constant rate of movement.

It is a further object of this invention to present a system for employing this invention to track a target in range.

In accordance with the present invention there is provided a motor means capable of moving an object, and a speed indicating means mechanically coupled to said motor means. A control means is electrically connected to said speed indicating means and a controlled power supply means is electrically connected to said control means and to said speed indicating means.

For a better understanding of the invention together with other and further objects thereof, reference is had to the following description taken in connection with the accompanying drawing, and the scope of the invention will be pointed out in the appended claims.

In the accompanying drawing:

The only figure is a block diagram of a system employing the present invention.

Referring now more particularly to the drawing, there is shown a portion of a radar range system employing one embodiment of the present invention. In general the system may be divided into seven major components, a signal generator 10, an electrical indicator means 11, a mechanical indicator means 13, a controlled power supply 14, a control means 15, a motor means 16, and a speed indicating means 17.

The improved signal generator 10 shown in the drawing is disclosed and claimed in the copending application of Edward F. MacNichol, Jr., Serial No. 584,230, filed March 22, 1945.

Signal generator means 10 comprises sweep generator 20, synchronized by the transmitted pulse of said radar system, a diode 21, an amplifier 22 and a variable resistor 24.

Blocking oscillator 25 of electrical indicator means 11 receives a signal from amplifier 22 of signal generator 10 by means of connection 26. The output of blocking oscillator 25 is applied to amplifier 27. A video signal is also applied to amplifier 27 as shown by signal input 28. The output of amplifier 27 is applied to deflection plates 30 of cathode ray tube 31 and a sweep voltage is applied to deflection plates 32 as represented by a connection made from sweep generator 20 of signal generator 10 to deflection plates 32 of cathode ray tube 31.

In this embodiment of the invention, mechanical indicator means 13 comprises a sight 34, a range dial 35 with a fixed reference point 36 and a ballistic cam 37. The ballistic cam 37 is mechanically connected to sight 34. Motor 16 is mechanically connected to ballistic cam 37 and range dial 35 of mechanical indicator 13. Motor 16 is also mechanically connected to contact arm 23 of variable resistor 24 of signal generator 10 and to speed indicating means 17. The above mentioned mechanical couplings are denoted by dotted lines numbered 39.

Controlled power supply means 14 comprises a differential amplifier 41, a variable resistor 42 and a power unit 43. In this embodiment of the invention power unit 43 is a thyratron rectifier unit. A tap 44 on variable resistor 42 is connected to differential amplifier 41 by means of a connection 45 which feeds a signal into amplifier 41. A second connection 46 between terminal 47 of speed indicating means 17 and differential amplifier 41 supplies a second signal to amplifier 41. The output of differential amplifier 41 is connected to a power unit 43. The output of power unit 43 is connected through three-position slew switch 50 of control means 15 to the input of motor 16. Rate control knob 51 of control unit 15 is mechanically connected to contact arm 52 of variable resistor 53. Displacement control knob 54 is mechanically connected to displacement generator 56. Again, mechanical couplings are designated by dotted lines 39. Contact arm 52 of variable resistor 53 is connected to one terminal 57 of displacement generator 56. A second terminal 58 of displacement generator 56 is connected to terminal 59 of speed indicating means 17.

In the operation of the system including the motor 16 and blocks 14, 15, and 17, differential amplifier 41 is designed so that output of amplifier 41 will be of such a value that the output of power unit 43 will be zero when a predetermined difference in potential is applied to signal inputs 45 and 46. This potential difference between signal inputs 45 and 46 may be zero or have a positive or negative value depending on the design of amplifier 41. To facilitate the explanation of this system it will be assumed that the output of power unit 43 is zero when the difference in potential between signal inputs 45 and 46 is zero. When the potential of one of the inputs, for example input 46, changes in one direction from this reference point, the output of the power unit 43 will remain zero; and when the potential of the input 46 changes in the opposite direction from the reference point, the output of the power unit 43 will have a finite value. The magnitude of the output from power unit 43 will depend on the difference in potential between signal inputs 45 and 46 of differential amplifier 41. The potential of signal input 45 may be varied by moving contact 44 along resistor 42. Since resistor 42 is connected between a source of positive voltage and ground, the potential of signal input 45 may be varied between zero and some positive value. The potential of signal input 46 depends on the position of contact arm 52 on resistor 53, the voltage developed in displacement generator 56, and the voltage developed in speed indicating means 17. In this system, both speed indicating means 17 and displacement generator 56 are permanent magnet generators. The potential of contact arm 52 may be varied between zero and some negative value. If generator 56 is stationary, no voltage will be generated between terminals 57 and 58, so terminal 58 will be at the same potential as contact arm 52 on resistor 53. Suppose further that motor 16 is also stationary. Speed indicating means 17 will be stationary and no voltage will be developed between terminals 47 and 59. Terminal 47 of speed indicating means 17 will be at the same potential as tap 52 as will signal input 46 of amplifier 41.

Assume that tap 44 is at the grounded point on resistor 42 and that tap 52 is at the grounded point on resistor 53. Signal inputs 45 and 46 are now at the same potential and, under the assumption made at the beginning of this discussion of operation, the output of power unit 43 will be zero so no power will be furnished to motor 16. Under the above conditions, motor 16 will remain stationary. Suppose now that rate control knob 51 is turned so that tap 52 is moved to some point on resistor 53 that is at a negative potential. Since no voltage is being generated in generator 56 or speed indicating device 17, signal input 46 is also at a negative potential. The output of differential amplifier 41 is such that power unit 43 now has a finite output. The output of power unit 43 is applied to motor 16 and causes motor 16 to rotate. Speed indicating device 17 is now rotated in such a direction as to cause terminal 47 to be at a more positive potential than terminal 59. The potential of signal input 46 will now rise until the potential difference between signal inputs 45 and 46 is such that the voltage applied to power unit 43 is that voltage that will cause the output of the power unit 43 to be just sufficient to supply the losses in motor 16. Once this point of equilibrium is reached, motor 16 will rotate at a constant speed. If motor 16 starts to rotate faster, speed indicating means 17 rotates faster and produces a higher generated voltage. This raises the potential of signal input 46 which reduces the output of power unit 43. Since the power being supplied to motor 16 is not sufficient to overcome the losses in motor 16, the speed of rotation will decrease. In a similar manner, if motor 16 tends to slow down, more power will be supplied to motor 16 to cause the speed of rotation to increase. If contact arm 52 is moved to a new point on resistor 53, a new equilibrium point will be reached with motor 16 rotating at a different speed. If contact arm 44 is moved to a point on resistor 42 that is at a positive potential, the unbalance in amplifier 41 will be the same as the unbalance caused by moving contact 52 to a point of more negative potential on resistor 53, that is, it will cause motor 16 to rotate at a speed higher than that indicated by the position contact arm 52. In this system, contact 44 on resistor 42 could be set to give the minimum rate of rotation desired and contact 52 used to cause the rate of rotation to increase above this desired minimum. Again resistor 42 might be a tapped resistor and circuit constants so chosen that moving contact 44 to successive tap positions would change the speed of rotation of motor 16 by a fixed amount, for example 100 revolutions per minute.

Up to this point in the discussion of the operation of the system including the motor 16 and blocks 14, 15, and 17, it has been assumed that generator 56 has been stationary. Now assume that dispalcement control knob 54 is suddenly turned. A voltage will be developed between terminals 57 and 58 that will cause signal input 46 to rise or fall depending on the polarity of the potential difference generated between terminals 57 and 58.

If signal input 46 rises in potential, motor 16 will slow down; if signal input 46 falls in potential, motor 16 will speed up. The polarity of the voltage generated between terminals 57 and 58 depends on the direction generator 56 is rotated which, in turn, depends on the direction knob 54 is rotated. Usually knob 54 is rotated for only a short period of time so generator 56 produces a voltage pulse. The reasons for this and also the reasons for mounting knobs 51 and 54 as shown will become obvious in the description of the operation of the entire system shown in the drawing.

Slew switch 50 has three positions. In one position, the output of power unit 43 is applied to motor 16 over a conductor 60. A second position of slew switch 50 disconnects the output of power unit 43 from motor 16 and applies a voltage from a source 61 of one polarity to motor 16 to cause motor 16 to rotate rapidly in a first direction. This position of slew switch 50 is used to make large angular displacements of the shaft of motor 16. A third position of slew switch 50 applies a voltage of opposite polarity from a source 62 to motor 16 to cause motor 16 to rotate rapidly in an opposite direction to the first direction mentioned above.

In the operation of the whole system illustrated in Fig. 1, signal generator 10 supplies a sweep voltage to cathode ray tube 31 of electrical indicator means 11. Variable resistor 24 controls the time a step voltage occurs in the output of amplifier 22. The step voltage from amplifier 22 is used to trigger blocking oscillator 25 which produces a sharp, narrow, voltage pulse at the same time the step occurs in the output waveform of amplifier 22. This pulse is used as a range mark on cathode ray tube 31. The voltage pulse from blocking oscillator 25 is fed to amplifier 27 where it is mixed with the video target signals applied at signal input 28. The output of amplifier 27 is connected to deflection plates 30 of cathode ray tube 31. If the range mark on the screen of cathode ray tube 31 is to follow the movement of a selected target echo in range, it will be necessary to move contact arm 23 of resistor 24 at a rate proportional to the rate of movement in range of the selected target. It will be obvious from the foregoing discussion that if contact arm 23 of resistor 24 is mechanically coupled to motor 16, motor 16 may be made to drive contact arm 23 at the desired rate.

Since motor 16 drives contact arm 23 at a rate proportional to the range to the target, then the angular position of the shaft of motor 16 with respect to some fixed point of reference is also proportional to the range to the target. It is possible, therefore, to mechanically couple motor 16 to ballistic cam 37 in such a manner that cam 37 is positioned in a manner proportional to the range to the selected target. Ballistic cam 37 may now be connected to a sight 34 in such a manner that sight 34 will be positioned properly so that a projectile leaving some type of launching device (not shown in Fig. 1) associated with sight 34 will strike the selected target if the optical axis of sight 34 is made to coincide with the line of sight to the selected target.

It may be desirable to know the range to the selected target. This may be accomplished by coupling a range dial 35 to motor 16. Range dial 35 may be calibrated so that the range to the selected target may be read opposite reference point 36.

In the tracking of a selected target in range with the aid of cathode ray tube 31, rate control knob 51 is moved so that the rate of change of position of the range mark corresponds to the rate of change of position of the target pip. The position of the range mark on the cathode ray tube screen should coincide with the position of the target pip. For small displacements in position of the range mark, displacement control knob 54 is rotated in the proper direction. If the range mark starts to fall behind or move ahead of the target pip, both knobs 51 and 54 may be rotated at the same instant to correct for error in rate and the error in displacement. Knobs 51 and 54 are mounted on concentric shafts so that they may be gripped together with one hand and rotated simultaneously.

The disclosed system finds its wide application in radar systems where it is known as the so-called aided tracking system. In systems of this kind the video signal is impressed on conductor 28 while the sweep generator is synchronized with the transmitted pulse signals. The saw tooth waves appearing in the output of the sweep generator are used for producing a range marker signal 33, which is mixed with the video signal impressed from the output of the receiver on amplifier 27 over conductor 28. This combined video, or intelligence signal, and the range marker signal 33 are then impressed on the cathode ray tube 31 whereupon they are reproduced in proper range relationship on the oscilloscope screen. The aided tracking consists of impressing the range marker signal which follows the selected echo signal image appearing on the screen of the oscilloscope tube 31. Thus, with proper synchronization and cophasing of the range unit 13 with marker signal 33, the range dial 35, which is rotated by the reversible motor 16, will continuously and automatically indicate the range of that target whose position is in coincidence with the position of the range marker signal 33 on the screen of oscilloscope 31. When the rotational speed of the reversible motor 16 conforms with the speed of the target, and the range marker signal is originally set so that the two images, i. e. the image of the target and the image of the range marker signal, are superimposed on the oscilloscope screen, then the range marker signal will follow the target, and we will have an automatic and continuous indication of the continuously changing range of the moving target.

The above outlined conditions of the operation presuppose that the setting of the potentiometer arm 52 on the rate-of-motion potentiometer 53 is such that the rate of motion of the object corresponds in electrical terms to the rate of motion of the potentiometer arm 23 on the range potentiometer 24. When this is the case, then no adjustments of any kind are necessary and the entire system will follow the moving target.

It is obvious, however, that the rate of change of the range between the moving object and the radar station may be continuously changing for such reasons as a curvilinear path of the approach or recession of the target with respect to the radar station, variable speed of the moving object, or both; in addition, the same variable conditions outlined above may be applied to the radar station itself when the latter is mounted on a moving object, such as flying airplane. When the rate of approach of targets to the radar station continuously changes, it becomes necessary to adjust the revolving speed of the reversible motor 16 to make it conform with the rate of change of the range. This is accomplished in four different ways, two of which are especially applicable to the conditions under consideration. The first two are found at the slew switch 50 where the operator is given an opportunity to disconnect the automatic aided-range-tracking channels altogether and resort to the automatic-manual control by connecting the reversible motor 16 directly either to the source of potential 61 or 62 which have opposite polarities. This of course is a very fast and very rough adjustment and, in practice, it is used, as a rule, only for the initial alignment of the range marker signal 33 with a desired image of a moving object or fast re-alignment of the range marker from one target to the other. It should be added here that conditions may arise when the target unexpectedly increases its speed, or the rate of change of the distance with respect to the radar station so much that a large gap will at once appear on the screen of the oscilloscope between the images of the marker signal and the echo signal. When this is so, switch 50 may be used for fast re-alignment of the images.

More important operating conditions contemplated by this system, however, are such when it becomes necessary merely to adjust the rotational speed of the aided tracking motor 16. Two independent adjustments are provided: one is the displacement knob 54 and the other is the rate-of-motion knob 51. The displacement knob will merely re-align the marker and the echo signals, should a minor mis-alignment of the two appear on the screen.

The second adjustment is the rate-of-motion adjustment per se. It begins with the rate-of-motion knob 51 which is mechanically connected by shaft 39 to the potentiometer arm 52. Resetting of the potentiometer arm at once changes the potential impressed by the potentiometer 53 through arm 52 and conductor 57 on the displacement generator 56 and generator 17 driven by the reversible motor 16. Generator 17 acts as a tachometer for indicating the rate of change of the range, and it also impresses an error voltage on the differential amplifier 41. This voltage is compared with the voltage impressed on the same amplifier by the potentiometer 42 through potentiometer arm 44, and the resultant potential is impressed on the reversible motor 16 through the power unit 43 and the three position switch 50. The upper portion of the shaft 39 operates the ballistic cam 37, the gun sight 34, the range dial 35, and the potentiometer arm 23. The potentiometer arm 23 acts as a variable biasing means for diode 21 with the result that variable portions of the saw tooth wave appear in the output of the diode. The transmitted portion of the saw tooth wave determines the phase of the range marker signal 33. This pulse is re-shaped in amplifier 27 and then appears as an image on the screen of the oscilloscope 31. When the rate-of-motion of the object producing the desired echo signal corresponds in electrical terms to the previously mentioned settings of the potentiometers 53 and 42, the range marker signal will follow the image of the selected object. When the two begin to differ, then the rate-of-motion of potentiometer arm 52 may be readjusted, and, if the difference is an insignificant one, the inphase relationship may be restored by using the rate-of-motion knob 51. When there is a sudden change in the two rates and the range of the object is "lost" temporarily, and it is desirable to restore the relationship very quickly, the operator is given the choice of using the three position switch 50 or the displacement knob 54.

From the above it follows that the radar system facilitates automatic tracking of moving targets, with the range unit continuously and automatically indicating proper range of selected objects. It also adjusts the ballistic cam and the gun sight so that their settings continuously correspond to the position of the selected object.

While there has been considered what is at present considered the preferred embodiment of the invention it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A range tracking system, said system comprising electrical indicator means; signal generator means, said generator means being connected to said electrical indicator means and including a variable source of voltage, said variable voltage source controlling the position of a suitable indication in said electrical indicator means; mechanical indicator means, said mechanical means comprising a range dial, proportioning means and sight means associated with said proportioning means; and means associated with said signal generator means and said mechanical indicator means for driving said variable voltage means, said proportioning means and said range dial at a plurality of predetermined constant speeds.

2. A system for moving an object at a plurality of predetermined constant speeds, said system comprising motor means; speed indicating means being coupled to said motor means, said indicating means comprising first generator means; control means comprising second generator means, a first variable voltage source being connected to said second generator means, a rate control knob associated with said first variable voltage means, a displacement control knob associated with said second generator means, and a slew switch; controlled power supply means, said means comprising differential amplifier means, second variable voltage means associated with said differential amplifier means and power unit means being connected to said differential amplifier means; means for connecting said slew switch to said power unit and to said motor means; means for connecting said second generator means to said speed indicating means; means for connecting said speed indicating means to said differential amplifier means; and means associated with said motor means for moving an object.

3. A system for moving an object at a plurality of predetermined constant rates, said system comprising motor means; speed indicating means; means of coupling said motor means to said speed indicating means; control means comprising a slew switch, displacement generator means, a source of variable voltage being connected to said displacement generator means, a rate control knob associated with said source of variable voltage and a displacement control knob associated with said displacement generator means; a controlled power supply being connected to said speed indicating means; means for connecting said slew switch to said controlled power supply and to said motor means; means for connecting said displacement generator means to said speed indicating means; and means associated with said motor means for moving an object.

4. In a radar system for tracking of a selected moving object including a source of intelligence signals representing radar data; a sweep generator; an electronic circuit capable of transmitting only a portion of a saw tooth wave appearing in the output of said sweep generator; a range marker signal circuit, connected to said electronic circuit, for converting the transmitted portion of said saw tooth wave into a range marker signal; a cathode ray tube connected to said source of intelligence signals and range marker circuit, said cathode ray tube having a screen for producing an image of said range marker and intelligence signals on said screen; biasing means for varying a biasing potential impressed on said electronic circuit and for varying the portion of the saw tooth wave transmitted by said electronic circuit; and a tracking circuit connected to and controlling the rate of change of said biasing means, said tracking circuit including controllable means for generating a plurality of potentials, a circuit for generating a potential proportional to the comparison of two of said potentials, a reversible motor connected to the output of said comparison circuit, a range indicator mechanically driven by said reversible motor, and a mechanical connection between said reversible motor and said biasing means for adjusting said biasing means at the rate corresponding to the rate of the movement of said selected object.

5. A system for driving an object at a plurality of predetermined constant speeds, comprising controlled power supply means; motor means mechanically connected to said object, said motor means being connected and having a speed responsive to the output of said power supply means; and control circuit means for controlling said power supply means, including generator means for indicating the speed of said motor means, said speed indicating generator means being mechanically coupled to said motor means and having an output coupled to the input of said power supply means, manually positionable displacement generator means connected to said speed indicating generator means, and potentiometer means connected to said displacement generator means, whereby the speed of said motor means and its driven object will respond to the speed of said indicating generator means and the position of said displacement generator means.

6. The system of claim 5, wherein said motor means comprises a reversible motor; and said controlled power supply means includes a differential amplifier receptive of the output from said speed indicating generator means, and a power unit connected between said amplifier and said motor means.

BRITTON CHANCE.

REFERENCES CITED

The following references are of record in the file of this patent:

UNITED STATES PATENTS

| Number | Name | Date |
|---|---|---|
| 2,115,086 | Riggs | Apr. 26, 1938 |
| 2,455,265 | Norgaard | Nov. 30, 1948 |
| 2,459,117 | Oliver | Jan. 11, 1949 |
| 2,467,208 | Hahn | Apr. 12, 1949 |